Sept. 11, 1951 H. L. THOMPSON 2,567,623
FISHING FLY WING FORMER
Filed Dec. 6, 1949 2 Sheets-Sheet 1
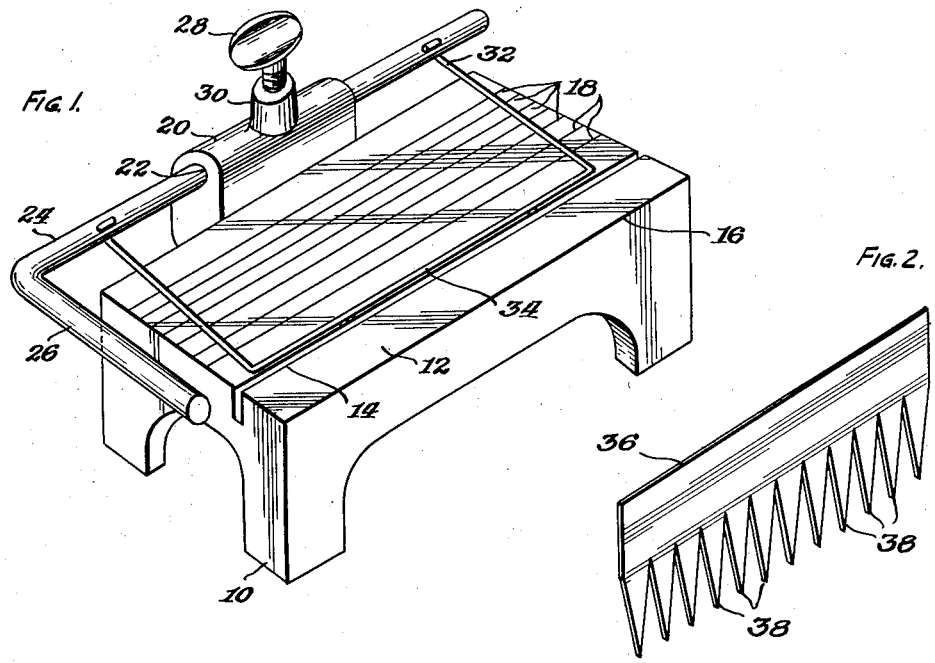
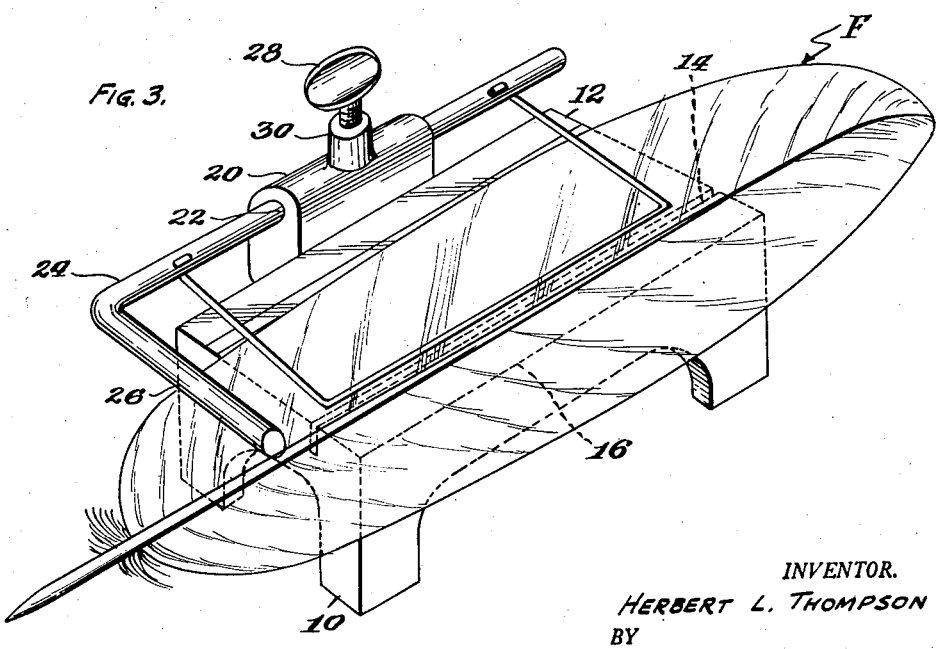
INVENTOR.
HERBERT L. THOMPSON
BY
Harry H. Hitzeman
ATTORNEY.

Patented Sept. 11, 1951

2,567,623

UNITED STATES PATENT OFFICE 2,567,623

FISHING FLY WING FORMER

Herbert L. Thompson, Elgin, Ill.

Application December 6, 1949, Serial No. 131,421

8 Claims. (Cl. 43—1)

My invention relates to a fishing fly wing former.

My invention relates more particularly to a device of the type described by the use of which fishing fly wings can be easily and quickly made by ordinary fishermen who prefer to make their own fly fishing lures.

Most fishing flies are formed with wings or portions of wings attached thereto.

The wings of fishing flies are made of various materials, but most of them are made of feathers. Whatever the material, it is generally prepared in a right and left pair and bound to the shoulder of the fly by several turns of strong thread.

The feathers most likely to be used for fly wings come from the body, wings, or tail of some bird. In structure, they consist of a hollow quill which is mostly embedded in the skin of the bird. The hollow in the quill becomes smaller and this supporting member of the feather becomes solid where the soft vane or webbing of the feather starts. From here to the tip, it is now called the shaft and is hard and smooth. The soft webbing of the feather is composed or barbs. These barbs, growing from each side of the shaft, are, in turn, supplied with barbules growing from their edges, and from the edges of the barbules, barbicels protrude likewise. It is these minute protuberances felting together that makes the webbing of a feather resist being separated into separate barbs.

While some flies are made by using small whole feathers, most flies and particularly those of the highest quality, use wings that are made from the barbs or webbing of the feather only. A strip of the webbing wide enough to form the wing is cut from the shaft, and another strip of the same size and shape cut from an opposite feather is paired with it to form a pair of wings. This carefully cut and paired set of wings is then bound to the fly in a manner familiar to those skilled in the art.

The principal object of the present invention is to provide an improved mechanism for making fishing fly wings of the type described, cut out of portions of feathers.

A further object of the present invention is to provide means for the rapid and easy constricting and cementing of feather webbing for preforming these wings so that they can be bound to the shoulder of the fly without requiring the skill and patience needed with wings composed of loose barbs.

A further object of the invention is to produce a device that is capable of rapidly separating the barbs of a feather into a plurality of sections of exactly the same width without disturbing the felting between the barbules and barbicels in the units left whole between the separations. More simply, the section of feather webbing will still remain a unit of webbing in its original condition excepting for the constricting and cementing to cause it to maintain its shape and form when removed and bound to the fly.

A further object of the invention is to provide means for forming and cementing a number of fly wings with their constrictions in a perfectly straight line, so that equal lengths of wing can be made, subject only to the variation from straight that is found in the terminal line formed by the tips of the barbs in any feather.

A further object of the invention is to provide means for constricting and cementing the butts of barbs to be used as fly tails and thin wing sections for compound wings for fly fishing lures.

Other objects and advantages will be more apparent from the following description wherein reference is had to the accompanying drawings, upon which Fig. 1 is a front perspective view of my improved fishing fly wing former;

Fig. 2 is a front perspective view of a comb which is used in conjunction therewith;

Fig. 3 is a perspective view similar to Fig. 1 showing a feather in place on the former about to be processed into wings;

Figure 4:
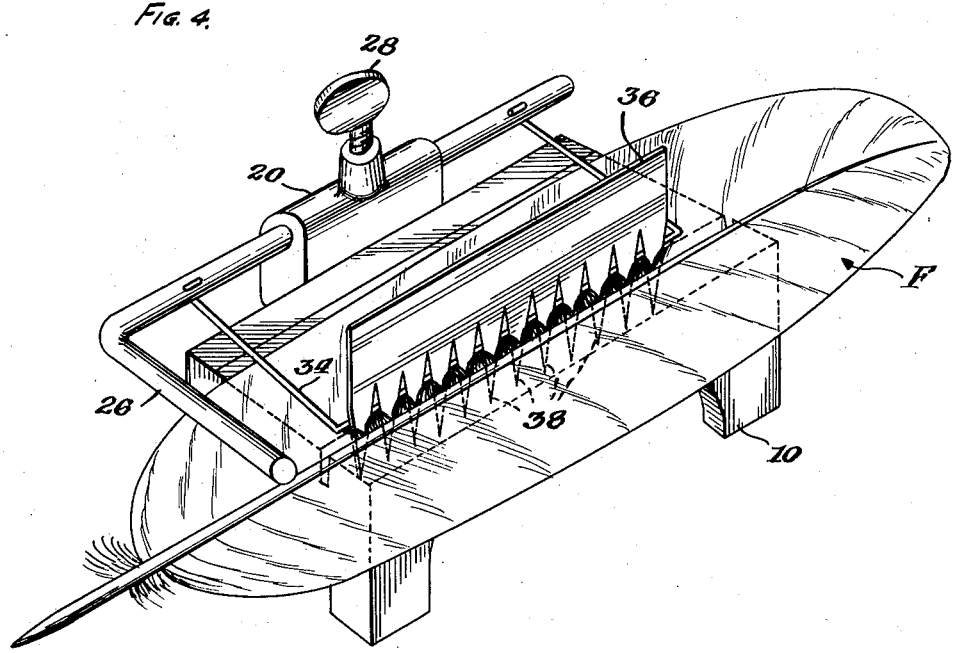
Fig. 4 is a perspective view similar to Fig. 3 showing the comb in position separating the barbs into a plurality of sections of equal width.

In the embodiment of the invention which I have chosen to illustrate and describe, I provide a wing former assembly which may include a rectangularly shaped base member 10 having a flat, smooth upper surface 12. I provide a bottomless, narrow slot 14 adjacent the forward edge 16 of the base 10, the slot being parallel to one of the long sides of the base. I also provide a plurality of gauge lines 18 upon the top 12 spaced apart and parallel with the slot 14.

A post 20 is provided at the back of the platform 12, the post having a longitudinal bore 22 therethrough to receive a spindle 24, bent at one end to provide a handle 26 to facilitate the partial rotation of the spindle. The spindle may be locked against rotation when desired by means of a thumb screw 28 which extends through a tapped opening in the boss 30 on the top of post 20.

A hold-down wire 32 may be U-shaped in form and fixedly secured at its ends to the spindle 24. The hold-down wire is of such size that the portion 34 thereof may bear against the platform 12 on the base 10 at the near edge of the slot 14 so that the slot may be easily located when covered by a feather.

In Fig. 2 I have shown a comb 36 preferably made of thin smooth material that is comparatively stiff or rigid. The comb is provided on one edge with a plurality of regularly spaced angular teeth 38, so that the pitch or spacing is equal and is a function of the length of the teeth. In practice, each wing forming unit is provided with a plurality of combs, each comb having a different tooth spacing by means of which different widths of wings may be manufactured.

The operation of the wing former will now be more clearly described. In order to form a plurality of wings from a feather, the feather F (Fig. 3), is placed in position upon the platform 12 of the base 10. The feather lies over the slot 14 and the portion 34 of the hold-down wire is brought forward and down to press a portion of the feather flat against the surface of the base. It may be locked in this position by means of the thumb screw 28. It will be noticed that the feather is so placed upon the platform 12 that the tip edge of the webbing of the feather is as near parallel with the wire 34 as the somewhat uneven contour of the tips will permit. This is for the purpose of keeping the wings to made as nearly as like in length as is possible. Obviously the length of the wings will depend upon the distance between the tips of the webbing and the center of the slot.

After a feather has been placed in position on the former as above described, the next step in processing the feather is to apply an adhesive, preferably a liquid, quick-drying cement, to the webbing in a line over the slot, the cement preferably being of a type which will adhere to the feather very firmly but will be readily removed from the metal surface of the base after drying.

In Fig. 4 I have shown the next step in my improved process, and that is the piercing by the teeth of the comb of the adhesive or cement-impregnated feather. Guided by the hold-down wire 34, the sharp teeth 38 of the comb are forced downwardly between the barbs of the feather and into the slot below, until the narrowing space between the teeth brings the barbs together in a neck of satisfactory width. In this position the cement is allowed to set and dry, after which the comb is removed, the hold-down wire is lifted and the feather is free, containing a row of permanently formed wings ready to be cut off and used.

Figure 5:
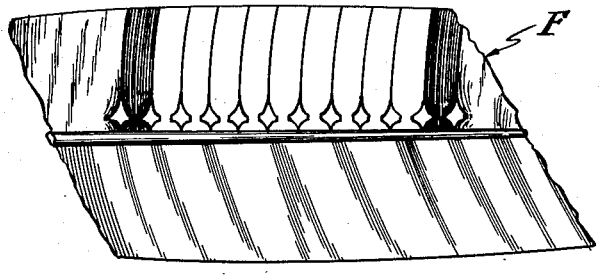
Fig. 5 is a fragmentary plan view of a feather that has been treated, showing the appearance of the finished wings or tails still attached to the feather shaft.

In this condition, left attached to the shaft of the feather, the wings are readily stored until used, and their size and shape can be easily seen for later selection. The finished condition of the feather is best illustrated in Fig. 5.

From the above and foregoing description it can be seen that I have provided a comparatively simple apparatus by the use of which a plurality of fishing fly wings may be easily and quickly formed so that fishing fly lures can be readily made with the use of these wings.

The gauge lines 18 on the surface of the base assist in locating the feather for the desired wing lengths on the formed and also assist in bringing the webbing tips parallel with the slot 14.

After the wings have thus been formed, they can be cut off when it is desired to make a lure, and in applying them to the lure it is a simple matter to wrap a thread about the cemented constricted portion. Thus there will be no tendency of the wing to buckle or wrinkle, the relative position of the barbs having been established by the cement and the binding thread will not contact the spread portion of the wing.

From the above and foregoing description it can be seen that by the use of my improved fishing fly wing former, it is a comparatively simple matter for a fly fisherman to manufacture his own lures. The process is comparatively simple and can be carried out by the average layman.

While I have illustrated and described a specific embodiment of the apparatus, it will be apparent to those skilled in the art that changes and modifications may be made in the exact details shown therein, and I do not wish to be limited in any particular; rather what I desire to secure and protect by Letters Patent of the United States is:

1. A fishing fly wing former comprising a base member having a flat upper surface with a longitudinal slot therein, a post connected thereto, a spindle journalled in said post, a hold-down wire carried by said spindle, said wire being adapted to hold a feather placed on said base, and a member having spaced teeth adapted to be pressed down into said slot through the barbs of a feather to separate the same into a plurality of sections of the same width.

2. A fishing fly wing former comprising a rectangularly shaped base member having a flat upper surface with a longitudinal slot therein, a post connected to said base member, a spindle journalled in said post, a U-shaped hold-down wire carried by said spindle, said wire being adapted to hold a feather placed on said base, and a comb member having spaced teeth capable of being pressed down into said slot through the barbs of a feather to separate the same into a plurality of sections of the same width.

3. A fishing fly wing former comprising a rectangularly shaped base member having a flat upper surface with a longitudinal slot therein, a post extending upwardly on one side of said base, a spindle journalled in said post, a U-shaped hold-down wire carried by said spindle, said wire being adapted to hold a feather placed on said base, and a comb member having spaced teeth capable of being pressed down into said slot through the barbs of a feather to separate the same into a plurality of sections of the same width.

4. A fishing fly wing former comprising a rectangularly shaped base member having a flat upper surface with a longitudinal slot therein, a post extending upwardly on one side of said base, a spindle journalled in said post, means for securing said spindle in any desired rotated position, a U-shaped hold-down wire carried by said spindle, said wire being adapted to hold a feather placed on said base, and a comb member having spaced teeth capable of being pressed down into said slot through the barbs of a feather to separate the same into a plurality of sections of the same width.

5. A fishing fly wing former comprisnig a rectangularly shaped base member having a flat upper surface with a longitudinal slot therein, a post extending upwardly on one side of said base, a spindle rotatably journalled therein, a thumb screw in said post capable of bearing against said spindle to hold the same in a fixed position, a U-shaped hold-down wire carried by said spindle, said wire being adapted to bear against a feather placed on said base and hold the portion of the same down adjacent said slot, and a comb member having spaced teeth capable of being pressed down into said slot through the barbs of a feather to separate the same into a plurality of sections of the same width.

6. A fishing fly wing former comprising a base member having a flat upper surface with a longitudinal slot therein, a post connected to said base, a spindle journalled in said post, a hold-down member carried by said spindle, said member being adapted to hold a feather placed on said base, and a comb member having spaced teeth adapted to be pressed down into said slot through the barbs of a feather to separate the same into a plurality of sections of the same width.

7. A fishing fly former comprising a base member having a flat upper surface with a longitudinal slot therein, a post connected to said base, a shaft journalled in said post, a U-shaped hold-down member carried thereby, said member being adapted to press against a feather placed on said flat surface, and a second member having a plurality of tooth portions adapted to be pressed down into said slot through the barbs of a feather to separate the same in a plurality of sections.

8. A fishing fly former comprising a base member having a flat upper surface with a longitudinal slot therein, a post associated therewith, a shaft journalled in said post, a hold-down member carried thereby, said member being adapted to press against a feather placed on said flat surface, and a second member having a plurality of tooth portions adapted to be pressed down into said slot through the barbs of a feather to separate the same in a plurality of sections.

HERBERT L. THOMPSON.

REFERENCES CITED

The following references are of record in the file of this patent:

UNITED STATES PATENTS

| Number | Name | Date |
| --- | --- | --- |
| 1,640,599 | Conn | Aug. 30, 1927 |
| 2,018,622 | Davenport | Oct. 22, 1935 |
| 2,236,781 | Pannier | Apr. 1, 1941 |
| 2,486,142 | Fong | Oct. 25, 1949 |

FOREIGN PATENTS

| Number | Country | Date |
| --- | --- | --- |
| 101,902 | Sweden | Apr. 30, 1941 |